US008450261B2

(12) United States Patent
Nakano et al.

(10) Patent No.: US 8,450,261 B2
(45) Date of Patent: *May 28, 2013

(54) CLEANING COMPOSITIONS WITH MONOCARBOXYLIC ACID MONOMERS DICARBOXYLIC MONOMERS, AND MONOMERS COMPRISING SULFONIC ACID GROUPS

(75) Inventors: Masato Nakano, Kakogawa (JP); Takahiro Tsumori, Nishinomiya (JP)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/741,461

(22) PCT Filed: Oct. 31, 2008

(86) PCT No.: PCT/JP2008/070367
§ 371 (c)(1), (2), (4) Date: Jul. 14, 2010

(87) PCT Pub. No.: WO2009/060966
PCT Pub. Date: May 14, 2009

(65) Prior Publication Data
US 2010/0275396 A1 Nov. 4, 2010

(30) Foreign Application Priority Data

Nov. 9, 2007 (JP) .................................. 2007-292303
Feb. 18, 2008 (JP) .................................. 2008-035480

(51) Int. Cl.
| | | |
|---|---|---|
| C11D 3/378 | (2006.01) | |
| C11D 1/72 | (2006.01) | |
| C11D 3/2075 | (2006.01) | |
| C11D 3/326 | (2006.01) | |
| C11D 3/386 | (2006.01) | |
| C11D 3/50 | (2006.01) | |

(52) U.S. Cl.
USPC ........... 510/475; 510/351; 510/361; 510/421; 510/426; 510/477; 510/492; 510/499

(58) Field of Classification Search
CPC .......... C11D 1/72; C11D 3/2075; C11D 3/326; C11D 3/378; C11D 3/386; C11D 3/50
USPC ................. 510/351, 361, 426, 475, 477, 492, 510/421, 499
See application file for complete search history.

(56) References Cited

U.S. PATENT DOCUMENTS

| 4,640,793 A | 2/1987 | Persinski et al. |
|---|---|---|
| 4,678,596 A | 7/1987 | Dupre et al. |
| 5,055,540 A | 10/1991 | Hughes et al. |
| 5,064,563 A | 11/1991 | Yamaguchi et al. |
| 5,076,957 A | 12/1991 | Diehl et al. |
| 5,175,361 A | 12/1992 | Denzinger et al. |
| 5,723,427 A | 3/1998 | Scherr et al. |
| 5,733,857 A | 3/1998 | Yamaguchi et al. |
| 5,783,540 A | 7/1998 | Secemski et al. |
| 5,993,666 A | 11/1999 | Yamaguchi et al. |
| 5,998,346 A | 12/1999 | Welch et al. |
| 6,037,431 A | 3/2000 | Shioji et al. |
| 6,060,443 A | 5/2000 | Cripe et al. |
| 6,114,294 A | 9/2000 | Gauthier et al. |
| 6,159,922 A | 12/2000 | Williams |
| 6,210,600 B1 | 4/2001 | Zhou et al. |
| 6,239,091 B1 | 5/2001 | Tartakousky et al. |
| 6,271,191 B1 * | 8/2001 | Kerobo et al. ................. 510/475 |
| 6,489,287 B1 | 12/2002 | Gauthier et al. |
| 6,630,440 B1 | 10/2003 | Song et al. |
| 6,903,058 B2 | 6/2005 | Nitsch et al. |
| 6,962,898 B2 | 11/2005 | Kessler et al. |
| 7,153,816 B2 | 12/2006 | Kessler et al. |
| 7,192,911 B2 | 3/2007 | Sunder et al. |
| 7,462,588 B2 | 12/2008 | Bayersdoerfer et al. |
| 7,879,154 B2 | 2/2011 | Warkotsch et al. |
| 2002/0198128 A1 | 12/2002 | Perkins |
| 2003/0158078 A1 | 8/2003 | Chang |
| 2003/0171246 A1 | 9/2003 | Boeckh et al. |
| 2004/0116319 A1 | 6/2004 | Nitsch et al. |
| 2005/0113271 A1 | 5/2005 | Pegelow et al. |
| 2005/0239680 A1 | 10/2005 | Buchmeier et al. |
| 2007/0042928 A1 | 2/2007 | Appleby et al. |
| 2008/0188391 A1 | 8/2008 | Seebeck et al. |
| 2008/0269446 A1 | 10/2008 | Michl et al. |
| 2009/0007990 A1 | 1/2009 | Klippel et al. |
| 2010/0024846 A1 | 2/2010 | Warkotsch et al. |
| 2010/0031976 A1 | 2/2010 | Warkotsch et al. |
| 2010/0041575 A1 | 2/2010 | Warkotsch et al. |

(Continued)

FOREIGN PATENT DOCUMENTS

| CA | 2 375 338 A1 | 12/2000 |
|---|---|---|
| CA | 2620240 A1 | 3/2007 |

(Continued)

OTHER PUBLICATIONS

International Search Report for PCT/JP2008/070367; Feb. 17, 2009.

(Continued)

Primary Examiner — Brian P Mruk
(74) Attorney, Agent, or Firm — Tiffany M. Zerby; Steven W. Miller

(57) ABSTRACT

Laundry detergents or cleaning compositions which comprises a copolymer composition comprising i) a copolymer having a weight-average molecular weight of from about 10,000 to about 50,000 and comprising a) 30-60 mol% structural units derived from monoethylenically unsaturated dicarboxylic acid or dicarboxylate; b) structural units derived from monoethylenically unsaturated monocarboxylic acid or monocarboxylate; c) structural units derived from monomers containing sulfonic acid or sulfonate groups and having no ester bonds or amido bonds; and ii) 10,000 ppm or less of residual monoethylenically unsaturated dicarboxylic acid or dicarboxylate monomer.

9 Claims, No Drawings

U.S. PATENT DOCUMENTS

| | | | |
|---|---|---|---|
| 2010/0081599 A1 | 4/2010 | Preuschen | |
| 2010/0093588 A1 | 4/2010 | Warkotsch et al. | |
| 2010/0160204 A1 | 6/2010 | Zipfel et al. | |
| 2010/0167975 A1* | 7/2010 | Vandermeulen et al. | 510/230 |
| 2010/0222247 A1 | 9/2010 | Zipfel et al. | |
| 2010/0249007 A1 | 9/2010 | Holderbaum et al. | |
| 2010/0249009 A1 | 9/2010 | Holderbaum et al. | |
| 2012/0015858 A1 | 1/2012 | Kessler et al. | |

FOREIGN PATENT DOCUMENTS

| | | |
|---|---|---|
| DE | 3473739 | 7/1989 |
| EP | 0851022 B1 | 2/2007 |
| EP | 1754778 A1 | 2/2007 |
| EP | 1727884 B1 | 10/2008 |
| JP | 58-67706 A | 4/1983 |
| JP | 63261000 A2 | 10/1988 |
| JP | 11021586 | 1/1990 |
| JP | 02-129020 A | 5/1990 |
| JP | 10245592 | 9/1991 |
| JP | 03-234713 A | 10/1991 |
| JP | 3278898 | 12/1991 |
| JP | 2000-355615 * | 12/2000 |
| JP | 2000-355615 A | 12/2000 |
| JP | 2003-500207 A | 1/2003 |
| JP | 2004-189785 A | 7/2004 |
| JP | 2006-347784 A | 12/2006 |
| JP | 2007-231263 A | 9/2007 |
| JP | 2008-510603 A | 4/2008 |
| JP | 2008-510864 A | 4/2008 |
| WO | 95-03342 A1 | 2/1995 |
| WO | WO 98/16612 | 4/1998 |
| WO | WO 2005/097963 A1 | 10/2005 |
| WO | WO 2007/025944 A1 | 3/2007 |
| WO | WO 2007/025955 A1 | 3/2007 |
| WO | 2007089001 A1 | 8/2007 |

OTHER PUBLICATIONS

New water-soluble monomers—Polymer applications (1983) vol. 32, No. 10, pp. 466-475 M. Kametani.

Chemical Profile 2-Acrylamido-2-methylpropanesulfonic acid—Fine chemicals (1999) vol. 28, No. 2, pp. 28-31.

* cited by examiner

CLEANING COMPOSITIONS WITH MONOCARBOXYLIC ACID MONOMERS DICARBOXYLIC MONOMERS, AND MONOMERS COMPRISING SULFONIC ACID GROUPS

TECHNICAL FIELD

The present invention is directed to laundry compositions and cleaning compositions containing copolymers of monocarboxylic acid monomers, dicarboxylic acid monomer and monomers containing sulfonic acid groups.

BACKGROUND ART

Detergent additives with excellent properties have been previously disclosed, including copolymers having structural units derived from acrylic acid (salt), maleic acid (salt) and monomers containing a sulfonic acid (salt) free of ester bonds and amido bonds such as 3-allyloxy-2-hydroxypropanesulfonic acid (salt) commonly referred to as HAPS; copolymers having structural units derived from acrylic acid (salt), maleic acid (salt), and sulfoethyl methacrylate, referred to as SEMS; and copolymers having structural units derived from acrylic acid (salt), maleic acid (salt), and 2-acrylamido-2-methylpropanesulfonic acid (salt) referred to as AMPS. See Japanese Kokai patent Application Nos. 2000-355615 and Hei 3[1991]-234713.

With regard to the performance of detergent additives, in order to improve detergency, it is believed to be important to improve the clay dispersibility and the iron precipitation inhibition. See Japanese Kokai patent Application No. 2004-189785. However, when the copolymer of SEMS and AMPS is used as a detergent additive, there is the problem of hydrolysis of ester bonds and amido bonds, and sufficient performance cannot be displayed. Consequently, in order to improve the clay dispersibility and the iron precipitation inhibition, it is preferred that the copolymer having structural units derived from acrylic acid (salt), maleic acid (salt), and monomers containing a sulfonic acid (salt) free of ester bonds and amido bonds be used.

However, for the copolymer having structural units derived from acrylic acid, maleic acid, and HAPS, the molecular weight has typically been low, with weight-average molecular weights of 9000 or less, and the clay dispersibility, especially the clay dispersibility in water with high hardness, is not sufficiently satisfactory.

Also, a copolymer having a weight-average molecular weight of 36,000 and has structural units derived from acrylic acid, maleic acid, and HAPS has further been disclosed in Japanese Kokai Patent Application No Hei 2[1990]-129020. However, the proportion of structural units derived from maleic acid (salt) is small (10 mol % in Application Example 8), and the iron precipitation inhibition cannot be sufficiently displayed.

Further, a copolymer that has structural units derived from acrylic acid, and HAPS, and structural units displaying hydrophobicity is disclosed in Japanese Kokai Patent Application No. 2007-231263. However, as it does not have structural units derived from maleic acid (salt), it is impossible to have a sufficiently satisfactory iron precipitation inhibition. Here, for the copolymer having structural units derived from acrylic acid (salt), structural units derived from maleic acid (salt), and structural units derived from HAPS, in order to increase the weight-average molecular weight and to increase the proportion of structural units derived from maleic acid (salt), the method described in Patent Reference 1 may be adopted. However, in this case, the quantity of residual maleic acid (salt) is too large, and the iron precipitation inhibition is poor. This is undesired.

DISCLOSURE OF THE INVENTION

Problems to be Solved by the Invention

The present invention relates to novel laundry detergents or cleaning compositions which comprises a copolymer composition comprising i) a copolymer having a weight-average molecular weight of from about 10,000 to about 50,000 and comprising a) 30-60 mol % structural units derived from monoethylenically unsaturated dicarboxylic acid (salt); b) structural units derived from monoethylenically unsaturated monocarboxylic acid (salt); c) structural units derived from monomers containing sulfonic acid (salt) groups and having no ester bonds or amido bonds; and ii) 12,000 ppm or less of residual monoethylenically unsaturated dicarboxylic acid (salt) monomer.

Means for Solving the Problems

A laundry detergent or cleaning composition of the present invention includes a copolymer composition comprising: i) a copolymer having a weight-average molecular weight of from about 10,000 to about 50,000 and comprising: a) 30-60 mol % structural units derived from monoethylenically unsaturated dicarboxylic acid (salt); b) structural units derived from monoethylenically unsaturated monocarboxylic acid (salt); c) structural units derived from monomers containing sulfonic acid (salt) groups and having no ester bonds or amido bonds; and ii) 12,000 ppm or less of residual monoethylenically unsaturated dicarboxylic acid (salt) monomer.

In a preferred embodiment, the laundry detergent or cleaning composition is selected from the group consisting of liquid laundry detergent compositions, solid laundry detergent compositions, hard surface cleaning compositions, liquid hand dishwashing compositions, solid automatic dishwashing compositions, liquid automatic dishwashing, and tab/unit dose form automatic dishwashing compositions.

In a preferred embodiment, the detergent or cleaning composition includes from about 1% to about 20% by weight of the detergent or cleaning composition, of the copolymer composition.

In a preferred embodiment, the monomer containing sulfonic acid (salt) groups and having no ester bonds or amido bonds is a 3-allyloxy-2-hydroxypropanesulfonic acid (salt) monomer.

In a preferred embodiment, the detergent or composition further includes a surfactant system.

In a preferred embodiment, the surfactant system includes $C_{10}$-$C_{15}$ alkyl benzene sulfonates.

In a preferred embodiment, the surfactant system includes $C_8$-$C_{18}$ linear alkyl sulfonate surfactant.

In a preferred embodiment, the surfactant system further includes one or more co-surfactant selected from the groups consisting of nonionic surfactants, cationic surfactants, anionic surfactants and mixtures thereof.

In a preferred embodiment, the detergent or composition further includes cleaning adjunct additives selected from the group consisting of enzymes, alkali builders, chelant builders, bleaches, bleaching assisting agents, perfumes, defoaming agents, bactericides, corrosion inhibitors, and mixtures thereof.

In a preferred embodiment, the laundry detergent or cleaning composition of the present invention further includes a nonionic surfactant and a chelant builder.

In a preferred embodiment, the chelant builder is selected from the group consisting of methyl glycine diacetic acid, salts of methyl glycine diacetic acid and mixtures thereof.

In a preferred embodiment, the laundry detergent or cleaning composition of the present invention further includes one or more enzymes.

In a preferred embodiment, the laundry detergent or cleaning composition of the present invention further includes a perfume.

In a preferred embodiment, the laundry detergent or cleaning composition of the present invention further includes a corrosion inhibitor.

According to another aspect of the present invention, a cleaning implement is provided. A cleaning implement of the present invention includes a nonwoven substrate and the laundry detergent or cleaning composition of the present invention.

Effect of the Invention

According to the present invention, there can be provided a laundry detergent or cleaning composition which can achieve a high level of compatibility between clay dispersibility under water having high hardness and an anti-iron deposition ability.

BEST MODE FOR CARRYING OUT THE INVENTION

<Laundry Detergents and Cleaning Compositions>

The inventive laundry detergents or cleaning compositions of the present invention comprise new copolymers comprising monocarboxylic acid monomers, dicarboxylic acid monomers and monomers containing sulfonic acid groups.

<Copolymer Composition>

The copolymer composition of the present invention contains (i) a copolymer that has a weight-average molecular weight ranging from about 10,000 to about 50,000 and (ii) 12,000 ppm or less of residual monoethylenically unsaturated dicarboxylic acid (salt) monomer. The copolymer contains (a) 30-60 mol % structural units derived from monoethylenically unsaturated dicarboxylic acid (salt) ("monomer (a)"), and it contains structural units derived from monoethylenically unsaturated monocarboxylic acid (salt) ("monomer (b)"), and structural units derived from monomers containing one or more sulfonic acid (salt) groups and having no ester bonds or amido bonds.

In the present specification, "salt" refers to salts of sodium, potassium, and other alkali metals; salts of calcium, magnesium and other alkaline-earth metals; ammonium salts; monoethanolamine, triethanolamine, and other organic amine salts, etc. They may be used either alone or as a mixture of several types. Among them, the preferable types include salts of sodium, potassium, and other alkali metals, more preferable types are sodium salts. In addition, in the present specification, "structural units derived from monomers" refers to the structural unit portions derived from the monomers in the polymer obtained by polymerization of monomers.

As monomer (a), any appropriate monoethylenically unsaturated dicarboxylic acid (salt) maybe adopted. Examples include, but are not limited to, maleic acid, itaconic acid, mesaconic acid, fumaric acid, citraconic acid, etc., as well as their salts and anhydrides. They may be used either alone or as a mixture of several types. As long as the effects of the present invention are not degraded, derivatives of the compounds presented as examples may be used. Maleic acid (salt) and maleic anhydride are specific embodiments of monomer (a).

As monomer (b), any appropriate monoethylenically unsaturated monocarboxylic acid (salt) may be used. Examples include, but are not limited to, acrylic acid, methacrylic acid, crotonic acid, isocrotonic acid, α-hydroxyacrylic acid, α-hydroxymetylacrylic acid, etc. as well as their salts. They may be used either alone or as a mixture of several types. As long as the effects of the present invention are not degraded, derivatives of the compounds presented as examples maybe used. Acrylic acid, methacrylic acid, and their salts are specific embodiments of monomer (b).

As monomer (c) one may make use of any monomers having unsaturated bonds (carbon-carbon double bonds) and containing a sulfonic acid (salt) free of ester bonds and amido bonds, such as a 3-allyloxy-2-hydroxypropanesulfonic acid (salt), 3-methallyloxy-2-hydroxypropane-sulfonic acid (salt), (meth)allylsulfonic acid (salt), vinylsulfonic acid (salt), (meth)allyloxy benzenesulfonic acid (salt), and styrenesulfonic acid (salt). Selected embodiments of monomer (c) include 3-allyloxy-2-hydroxypropanesulfonic acids (salts) monomer, and 3-methallyloxy-2-hydroxypropanesulfonic acid (salt). In particular, 3-allyloxy-2-hydroxypropanesulfonic acids (salts) are usable. Examples of 3-allyloxy-2-hydroxypropanesulfonic acids (salts) include 3-allyloxy-2-hydroxypropanesulfonic acids and their salts. They may be used either alone or as a mixture of several types.

For the copolymer composition of the present invention, as long as the effects of the present invention are not degraded, in addition to said structural units derived from monoethylenically unsaturated dicarboxylic acid (salt) monomer, the structural units derived from monoethylenically unsaturated dicarboxylic acid (salt) monomer, and the structural units derived from the monomer containing sulfonic acid (salt) groups having no ester bonds or amido bonds, there maybe structural units derived from other monomers (d). Said other monomers (d) may be any appropriate type of monomer as long as they can be copolymerized with monoethylenically unsaturated monocarboxylic acid (salt) monomers, monoethylenically unsaturated dicarboxylic acid (salt) monomers, monomers containing sulfonic acid (salt) groups having no ester bonds or amido bonds (HAPS, etc.). Examples of said other monomers (d) include styrene, vinyl acetate, N-vinylpyrrolidone, N-vinylpyridine, (meth)acrylonitrile, (meth)acrylamide, methyl(meth)acrylate, ethyl(meth)acrylate, butyl(meth)acrylate, lauryl(meth)acrylate, stearyl (meth)acrylate, and other alkyl(meth)acrylates, hydroxymethyl (meth)acrylate, hydroxyethyl meth)acrylate, hydroxypropyl (meth)acrylate, 2-ethylhexyl(meth)acrylate, dimethylaminoethyl(meth)acrylate, diethylaminoethyl(meth)acrylate, (meth)allyl alcohols and their alkylene oxide adducts, (iso) prenol and its alkylene oxide adducts, 3-(meth)acryloxy-1,2-dihydroxypropane, 3-(meth)acryloxy-1,2-di(poly)alkylene oxide ether propanes, 3-(meth)allyloxy-2-hydroxypropane phosphoric acid (salt), 2-acrylamide methyl-2-propanesulfonic acid (salt), sulfoethyl methacrylate, sulfopropyl methacrylate, sulfomethyl(meth)acrylamide, etc.

In the copolymer composition of the present invention, for the structural units derived from monoethylenically unsaturated monocarboxylic acid (salt) monomer (b), structural units derived from monoethylenically unsaturated dicarboxylic acid (salt) monomer (a), structural units derived from monomer (c) containing sulfonic acid (salt) groups having no ester bonds or amido bonds, and structural units derived from other monomers (d), the proportions ((b)/(a)/(c)/(d)) in molar ratio should be in the range of 30-60/30-60/5-16/0-5, with a sum of 100 mol %, or preferably in the range of 35-55/35-55/5-16/0-15, with a sum of 100 mol %, or more preferably in the range of 40-50/40-50/5-16/0-5, with a sum of 100 mol %.

In the copolymer composition of the present invention, the weight-average molecular weight of the copolymer should be in the range of from about 10,000 to about 50,000, or preferably in the range of from about 11,000 to about 30,000, or more preferably in the range of from about 12,000 to about 20,000.

For the copolymer composition of the present invention, the content of residual monoethylenically unsaturated dicarboxylic acid (salt) monomer is 12,000 ppm or less in solids content equivalents, or preferably 9500 ppm or less, or more preferably 7000 ppm or less.

For the copolymer composition of the present invention, the clay dispersibility is preferably 1.00 or higher, or more preferably 1.10 or higher. The measurement method for clay dispersibility is included below.

The copolymer composition of the present invention has an iron precipitation inhibition preferably of 92.5 or higher, or more preferably of 93.0 or higher. The measurement method for iron precipitation inhibition is included below.

The copolymer of the present invention may be produced by any copolymerization methods known in the industry as long as the parameters of the described polymer are met. Example of copolymers and methods of producing them are shown in the Examples below.

<Laundry Detergent and Cleaning Composition Use of the Copolymer Composition>

The copolymers of the present invention are improved for clay dispersility and inhibition of iron-precipitation in water with high hardness. These benefits make them useful in laundry detergents and cleaning compositions. The copolymers according to the present invention can be added to the laundry detergents and cleaning compositions in amounts of generally from about 1% to about 20% by weight of the composition, preferably from about 2.5% to about 15% by weight, and more preferably from about 5% to about 10% by weight, based on the particular overall composition.

In addition, the laundry detergents and cleaning compositions generally comprise surfactants and, if appropriate, other polymers as washing substances, builders and further customary ingredients, for example cobuilders, complexing agents, bleaches, standardizers, graying inhibitors, dye transfer inhibitors, enzymes and perfumes.

The copolymers of the present invention may be utilized in laundry detergents or cleaning compositions comprising a surfactant system comprising $C_{10}$-$C_{15}$ alkyl benzene sulfonates (LAS) and one or more co-surfactants selected from nonionic, cationic, anionic or mixtures thereof. The selection of co-surfactant maybe dependent upon the desired benefit. In one embodiment, the co-surfactant is selected as a nonionic surfactant, preferably $C_{12}$-$C_{18}$ alkyl ethoxylates. In another embodiment, the co-surfactant is selected as an anionic surfactant, preferably $C_{10}$-$C_{18}$ alkyl alkoxy sulfates (AE$_x$S) wherein x is from 1-30. In another embodiment the co-surfactant is selected as a cationic surfactant, preferably dimethyl hydroxyethyl lauryl ammonium chloride. If the surfactant system comprises $C_{10}$-$C_{15}$ alkyl benzene sulfonates (LAS), the LAS is used at levels ranging from about 9% to about 25%, or from about 13% to about 25%, or from about 15% to about 23% by weight of the composition.

The surfactant system may comprise from 0% to about 7%, or from about 0.1% to about 5%, or from about 1% to about 4% by weight of the composition of a co-surfactant selected from a nonionic co-surfactant, cationic co-surfactant, anionic co-surfactant and any mixture thereof.

Non-limiting examples of nonionic co-surfactants include: $C_{12}$-$C_{18}$ alkyl ethoxylates, such as, NEODOL® nonionic surfactants from Shell; $C_6$-$C_{12}$ alkyl phenol alkoxylates wherein the alkoxylate units are a mixture of ethyleneoxy and propyleneoxy units; $C_{12}$-$C_{18}$ alcohol and $C_6$-$C_{12}$ alkyl phenol condensates with ethylene oxide/propylene oxide block alkyl polyamine ethoxylates such as PLURONIC® from BASF; $C_{14}$-$C_{22}$ mid-chain branched alcohols, BA, as discussed in U.S. Pat. No. 6,150,322; $C_{14}$-$C_{22}$ mid-chain branched alkyl alkoxylates, BAE$_x$, wherein x is from 1-30, as discussed in U.S. Pat. No. 6,153,577, U.S. Pat. No. 6,020,303 and U.S. Pat. No. 6,093,856; alkylpolysaccharides as discussed in U.S. Pat. No.4,565,647 Llenado, issued Jan. 26, 1986; specifically alkylpolyglycosides as discussed in U.S. Pat. No. 4,483,780 and U.S. Pat. No. 4,483,779; polyhydroxy fatty acid amides as discussed in U.S. Pat. No. 5,332,528; and ether capped poly (oxyalkylated) alcohol surfactants as discussed in U.S. Pat. No. 6,482,994 and WO 01/42408.

Non-limiting examples of semi-polar nonionic co-surfactants include: water-soluble amine oxides containing one alkyl moiety of from about 10 to about 18 carbon atoms and 2 moieties selected from the group consisting of alkyl moieties and hydroxyalkyl moieties containing from about 1 to about 3 carbon atoms; water-soluble phosphine oxides containing one alkyl moiety of from about 10 to about 18 carbon atoms and 2 moieties selected from the group consisting of alkyl moieties and hydroxyalkyl moieties containing from about 1 to about 3 carbon atoms; and water-soluble sulfoxides containing one alkyl moiety of from about 10 to about 18 carbon atoms and a moiety selected from the group consisting of alkyl moieties and hydroxyalkyl moieties of from about 1 to about 3 carbon atoms. See WO 01/32816, U.S. Pat. No. 4,681,704, and U.S. Pat. No. 4,133,779.

Non-limiting examples of cationic co-surfactants include: the quaternary ammonium surfactants, which can have up to 26 carbon atoms include: alkoxylate quaternary ammonium (AQA) surfactants as discussed in U.S. Pat. No. 6,136,769; dimethyl hydroxyethyl quaternary ammonium as discussed in U.S. Pat. No. 6,004,922; dimethyl hydroxyethyl lauryl ammonium chloride; polyamine cationic surfactants as discussed in WO 98/35002, WO 98/35003, WO 98/35004, WO 98/35005, and WO 98/35006; cationic ester surfactants as discussed in U.S. Pat. Nos. 4,228,042, 4,239,660 4,260,529 and U.S. Pat. No. 6,022,844; and amino surfactants as discussed in U.S. Pat. No. 6,221,825 and WO 00/47708, specifically amido propyldimethyl amine (APA).

Nonlimiting examples of anionic co-surfactants useful herein include: $C_{10}$-$C_{20}$ primary, branched chain and random alkyl sulfates (AS); $C_{10}$-$C_{18}$ secondary (2,3) alkyl sulfates; $C_{10}$-$C_{18}$ alkyl alkoxy sulfates (AE$_x$S) wherein x is from 1-30; $C_{10}$-$C_{18}$ alkyl alkoxy carboxylates comprising 1-5 ethoxy units; mid-chain branched alkyl sulfates as discussed in U.S. Pat. No. 6,020,303 and U.S. Pat. No. 6,060,443; mid-chain branched alkyl alkoxy sulfates as discussed in U.S. Pat. No. 6,008,181 and U.S. Pat. No. 6,020,303; modified alkylbenzene sulfonate (MLAS) as discussed in WO 99/05243, WO 99/05242 and WO 99/05244; methyl ester sulfonate (MES); and alpha-olefin sulfonate (AOS).

The present invention may also relates to compositions comprising the inventive copolymers and a surfactant system comprising $C_8$-$C_{18}$ linear alkyl sulphonate surfactant and a co-surfactant. The compositions can be in any form, namely, in the form of a liquid; a solid such as a powder, granules, agglomerate, paste, tablet, pouches, bar, gel; an emulsion; types delivered in dual-compartment containers; a spray or foam detergent; premoistened wipes (i.e., the cleaning composition in combination with a nonwoven material such as that discussed in U.S. Pat. No. 6,121,165, Mackey, et al.); dry wipes (i.e., the cleaning composition in combination with a nonwoven materials, such as that discussed in U.S. Pat. No. 5,980,931, Fowler, et al.) activated with water by a consumer; and other homogeneous or multiphase consumer cleaning product forms.

In one embodiment, the cleaning composition of the present invention is a liquid or solid laundry detergent composition. In another embodiment, the cleaning composition of the present invention is a hard surface cleaning composition, preferably wherein the hard surface cleaning composition impregnates a nonwoven substrate. As used herein "impregnate" means that the hard surface cleaning composition is placed in contact with a nonwoven substrate such that at least a portion of the nonwoven substrate is penetrated by the hard surface cleaning composition, preferably the hard surface cleaning composition saturates the nonwoven substrate. The cleaning composition may also be utilized in car care compositions, for cleaning various surfaces such as hard wood, tile, ceramic, plastic, leather, metal, glass. This cleaning composition could be also designed to be used in a personal care and pet care compositions such as shampoo composition, body wash, liquid or solid soap and other cleaning composition in which surfactant comes into contact with free hardness and in all compositions that require hardness tolerant surfactant system, such as oil drilling compositions.

In another embodiment the cleaning composition is a dish cleaning composition, such as liquid hand dishwashing compositions, solid automatic dishwashing compositions, liquid automatic dishwashing compositions, and tab/unit does forms of automatic dishwashing compositions.

Automatic detergent compositions may comprise low foaming nonionic surfactants (LFNIs). LFNI can be present in amounts from about 0.25% to about 4%. LFNIs are most typically used in automatic detergents on account of the improved water-sheeting action (especially from glass) which they confer to the gel automatic detergents. Preferred LFNIs include nonionic alkoxylated surfactants, especially ethoxylates derived from primary alcohols, and blends thereof with more sophisticated surfactants, such as the polyoxypropylene/polyoxyethylene/polyoxypropylene reverse block polymers. The PO/EO/PO polymer-type surfactants are well-known to have foam suppressing or defoaming action, especially in relation to common food soil ingredients such as egg. In a preferred embodiment, the LFNI is an ethoxylated surfactant derived from the reaction of a monohydroxy alcohol or alkylphenol containing from about 8 to about 20 carbon atoms, excluding cyclic carbon atoms, with from about 6 to about 15 moles of ethylene oxide per mole of alcohol or alkyl phenol on an average basis. A particularly preferred LFNI is derived from a straight chain fatty alcohol containing from about 16 to about 20 carbon atoms ($C_{16}$-$C_{20}$alcohol), preferably a $C_{18}$alcohol, condensed with an average of from about 6 to about 15 moles, preferably from about 7 to about 12 moles, and most preferably from about 7 to about 9 moles of ethylene oxide per mole of alcohol. Preferably the ethoxylated nonionic surfactant so derived has a narrow ethoxylate distribution relative to the average.

The LFNI can optionally contain propylene oxide in an amount up to about 15% by weight. Certain of the block polymer surfactant compounds designated PLURONIC® and TETRONIC® by the BASF-Wyandotte Corp., Wyandotte, Mich., are suitable in gel automatic detergents of the invention. LFNIs which may also be used include a C-18 alcohol polyethoxylate, having a degree of ethoxylation of about 8, commercially available as "SLF-18 Poly-tergent" from BASF Corp.

Dish washing compositions may additionally contain a dispersant polymer typically in the range from 0 to about 25%, preferably from about 0.5% to about 20%, more preferably from about 1% to about 7% by weight of the detergent. The dispersant polymer may be ethoxylated cationic diamines or ethoxylated cationic polyamines described in U.S. Pat. No. 4,659,802. Other dispersant polymers suitable for use include co-polymers synthesized from acrylic acid, maleic acid and methacrylic acid such as ACUSOL® 480N supplied by Rohm & Haas and an acrylic-maleic (ratio 80/20) phosphono end group dispersant copolymers sold under the tradename of Acusol 425N (E) available from Rohm &Haas. Polymers containing both carboxylate and sulphonate monomers, such as ALCOSPERSE® polymers (supplied by Alco) are also acceptable dispersant polymers. In one embodiment an ALCOSPERSE® polymer sold under the trade name ALCOSPERSE® 725, is a co-polymer of Styrene and Acrylic Acid with the following structure:

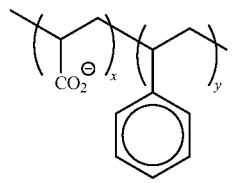

x:y = 60:40, or 50:50, MW = 8000.

ALCOSPERSE® 725 may also provide a metal corrosion inhibition benefit.

Other dispersant polymers are low molecular weight modified polyacrylate copolymers including the low molecular weight copolymers of unsaturated aliphatic carboxylic acids disclosed in U.S. Pat. Nos. 4,530,766, and 5,084,535 and European Patent Application No. 66,915, published Dec. 15, 1982.

Dish washing compositions may utilize detergent builders to assist in controlling mineral hardness and dispersancy. Inorganic as well as organic builders can be used. Embodiment of such dish washing product can be selected from the group consisting of phosphate, phosphate oligomers or polymers and salts thereof, silicate oligomers or polymers and salts thereof, aluminosilicates, magnesioaluminosiliates, citrate, methyl glycine diacetic acid and/or salts thereof, glutamatic diacetic acid and/or salts thereof and mixtures thereof. Phosphate detergent builders include, but are not limited to, the alkali metal, ammonium and alkanolammonium salts of polyphosphates. Silicate builders herein are any silicates which are soluble to the extent that they do not adversely affect spotting/filming characteristics of the gel detergent composition. Aluminosilicate builders can be used in the present compositions though are not preferred for automatic dishwashing detergents. Carbonate builders include alkaline earth and alkali metal carbonates as disclosed in German Patent Application No. 2,321,001 published on Nov. 15, 1973. Various grades and types of sodium carbonate and sodium sesquicarbonate can be used, certain of which are particularly useful as carriers for other ingredients, especially: detersive surfactants. Organic detergent builders include a wide variety of polycarboxylate compounds. Other useful builders include the ether hydroxypolycarboxylates, copolymers of maleic anhydride with ethylene or vinyl methyl ether, 1,3,5-trihydroxy benzene-2,4,6-trisulphonic acid, and carboxymethyloxysuccinic acid, the various I alkali metal, ammonium and substituted ammonium salts of polyacetic acids such as ethylenediaminetetraacetic acid and nitrilotriacetic acid, as well as polycarboxylates such as mellitic acid, succinic acid, oxydisuccinic acid, polymaleic acid, benzene 1,3,5-tricarboxylic acid, carboxymethyloxysuccinic acid, and soluble salts thereof. Citrate builders, e.g., citric acid and soluble salts thereof (particularly sodium salt), are polycarboxylate builders of particular importance for heavy duty laundry detergent and automatic dishwashing formulations due to their availability from renewable resources and their biodegradability. Methyl glycine diacetic acid and/or salts thereof (MGDA) may also be utilized as builders in the present composition. A preferred MGDA compound is a salt of methyl glycine iacetic acid Suitable salts include the diammonium 1.0 slt, the dipotassium salt and, preferably, the disodium salt. Glutamatic diacetic acid and/or salts thereof (GLDA) may also be utilized as builders in the present compositions. A preferred GLDA compound is a salt of glutamic diacetic acid. Suitable salts include the diammonium salt, the dipotassium salt and, preferably, the disodium salt. 1-hydroxyethylidene-1,1-diphosphonic acid (HEDP) may also be utilized as a builder in the present compositions.

Perfume maybe added to the compositions of the present invention. The detergent compositions can contain agents that are effective as corrosion inhibitors and/or anti-tarnish aids.

"Detergent enzyme", as used herein, means any enzyme having a cleaning, stain removing or otherwise beneficial effect in a gel detergent composition. Preferred enzymes are hydrolases such as proteases, amylases and lipases. Highly preferred for automatic dishwashing are amylases and/or proteases, including both current commercially available types and improved types. Enzyme-containing compositions herein can comprise from about 0.001% to about 10%, preferably from about 0.005% to about 8%, most preferably from about 0.01% to about 6%, by weight of an enzyme.

The compositions herein can also optionally contain one or more transition-metal selective sequestrants, "chelants" or "chelating agents", e.g., iron and/or copper and/or manganese chelating agents. Chelating agents suitable for use herein can be selected from the group consisting of aminocarboxylates, phosphonates (especially the aminophosphonates), polyfunctionally-substituted aromatic chelating agents, and mixtures thereof. Commercial chelating agents for use herein include the BEQUEST series, and chelants from Monsanto, DuPont, and Nalco, Inc.

The detergent composition can be preferably low foaming, readily soluble in the washing medium and most effective at pH values best conducive to improved cleaning performance, such as in a range of desirably from about pH 6.5 to about pH 12.5, and preferably from about pH 7.0 to about pH 12.0, more preferably from about pH 8.0 to about pH 12.0. The pH adjusting components are desirably selected from sodium or potassium hydroxide, sodium or potassium carbonate or sesquicarbonate, sodium or potassium silicate, boric acid, sodium or potassium bicarbonate, sodium or potassium borate, and mixtures thereof.

An embodiment of the present invention relates to a gel detergent composition comprising an organic solvent selected from the group consisting of low molecular weight aliphatic or aromatic alcohols, low molecular weight alkylene glycols, low molecular weight alkylene glycol ethers, low molecular weight esters, low molecular weight alkylene amines, low molecular weight alkanolamines, and mixtures thereof.

Any adjunct ingredient in any amount may be used in the gel detergent composition. For example, adjunct ingredients may be selected from the group consisting of nanoparticles, functionalized surface molecules, polymers, surfactants, co-surfactants, metal ions, proteins, dyes, acids, optical brighteners, colorants, filler salts, hydrotropes, preservatives, antioxidants, germicides, fungicides, color speckles, solubilizing agents, carriers and mixtures thereof.

Quite typically, cleaning compositions herein such as laundry detergents, laundry detergent additives, hard surface cleaners, synthetic and soap-based laundry bars, fabric softeners and fabric treatment liquids, solids and treatment articles of all kinds will require several adjuncts, though certain simply formulatedproducts, such as bleach additives, may require only, for example, an oxygen bleaching agent and a surfactant as described herein. A comprehensive list of suitable laundry or cleaning adjunct materials can be found in WO 99/05242.

Common cleaning adjuncts include builders, enzymes, polymers not discussed above, bleaches, bleach activators, catalytic materials and the like excluding any materials already defined hereinabove. Other cleaning adjuncts herein can include suds boosters, suds suppressors (antifoams) and the like, diverse active ingredients or specialized materials such as dispersant polymers (e.g., from BASF Corp. or Rohm & Haas) other than those described above, color speckles, silvercare, anti-tarnish and/or anti-corrosion agents, dyes, fillers, germicides, alkalinity sources, hydrotropes, anti-oxidants, enzyme stabilizing agents, pro-perfumes, perfumes, solubilizing agents, carriers, processing aids, pigments, and, for liquid formulations, solvents, chelating agents, dye transfer inhibiting agents, dispersants, brighteners, suds suppressors, dyes, structure elasticizing agents, fabric softeners, anti-abrasion agents, hydrotropes, processing aids, and other fabric care agents, surface and skin care agents. Suitable examples of such other cleaning adjuncts and levels of use are found in U.S. Pat. Nos. 5,576,282, 6,306,812 B1 and 6,326,348 B1.

<Method of Use>

The present invention includes a method for cleaning a targeted surface. As used herein "targeted surface" may include such surfaces such as fabric, dishes, glasses, and other cooking surfaces, hard surfaces, hair or skin. As used herein "hard surface" includes hard surfaces being found in a typical home such as hard wood, tile, ceramic, plastic, leather, metal, glass. Such method includes the steps of contacting the composition comprising the modified polyol compound, in neat form or diluted in wash liquor, with at least a portion of a targeted surface then optionally rinsing the targeted surface. Preferably the targeted surface is subjected to a washing step prior to the aforementioned optional rinsing step. For purposes of the present invention, washing includes, but is not limited to, scrubbing, wiping and mechanical agitation.

As will be appreciated by one skilled in the art, the cleaning compositions of the present invention are ideally suited for use in home care (hard surface cleaning compositions) and/or laundry applications.

The composition solution pH is chosen to be the most complimentary to a target surface to be cleaned spanning broad range of pH, from about 5 to about 11. For personal care such as skin and hair cleaning pH of such composition preferably has a pH from about 5 to about 8 for laundry cleaning compositions pH of from about 8 to about 10. The compositions are preferably employed at concentrations of from about 200 ppm to about 10,000 ppm in solution. The water temperatures preferably range from about 5° C. to about 100° C.

For use in laundry cleaning compositions, the compositions are preferably employed at concentrations from about 200 ppm to about 10000 ppm in solution (or wash liquor). The water temperatures preferably range from about 5° C. to about 60° C. The water to fabric ratio is preferably from about 1:1 to about 20:1.

The method may include the step of contacting a nonwoven substrate impregnated with an embodiment of the composition of the present invention As used herein "nonwoven substrate" can comprise any conventionally fashioned nonwoven sheet or web having suitable basis weight, caliper (thickness), absorbency and strength characteristics. Examples of suitable commercially available nonwoven substrates include those marketed under the tradename SONTARA® by DuPont and POLYWEB® by James River Corp.

As will be appreciated by one skilled in the art, the cleaning compositions of the present invention are ideally suited for use in liquid dish cleaning compositions. The method for using a liquid dish composition of the present invention comprises the steps of contacting soiled dishes with an effective amount, typically from about 0.5 ml. to about 20 ml. (per 25 dishes being treated) of the liquid dish cleaning composition of the present invention diluted in water.

EXAMPLES

<Weight-Average Molecular Weight>

The weight-average molecular weight (Mw) refers to the value measured by means of GPC (gel permeation chromatography).

Measurement device: "Shodex SYSTEM-2" manufactured by Showa Denko K.K.

Column: It is prepared by connecting in series the "Asahipak GF-710 HQ" and "Ashipak GF-310 HQ" manufactured by Showa Denko K.K.

Eluting liquid: 0. 1N sodium acetate/acetonitrile=7/3 (ratio by volume)

Flow rate: 0.5 mL/min

Temperature: 40° C.

Calibration line: It is prepared by using a standard sample of polyacrylic acid (product of Sowa Kagaku K.K.)

Detector: RI

<Solids Content Measurement Method>

The solids content of the reaction liquid containing copolymer after polymerization is computed by taking the nonvolatile content remaining after 1-h treatment of the reaction liquid by a hot-air drier at 170° C. as the solids content.

<Clay Dispersibility>

(1) First, 600 g of glycine buffer solution are prepared by adding ion-exchanged water to 67.56 g of glycine, 52.6 g of sodium chloride, and 60 mL of 1 mol/L aqueous solution of NaOH.

(2) Pure water is added to 0.817 g of calcium chloride dihydride and 60 g of the prepared liquid of (1) to 1000 g as the dispersion. Also, a 0.1% (solids content equivalent) aqueous solution of polymer is prepared.

(3) In a conventional experimental 30-cc test tube used, 0.3 g of JIS Test Powder I of 11 types of clay (fine grains, product of Kando Rhom [transliteration], according to the Powder Industry Association of Japan) is added, followed by addition of 27 g of the dispersion prepared in (2) and 3 g of the 0.1% (solids content equivalent) aqueous solution of polymer. In this case, the concentration of calcium becomes 500 ppm in calcium carbonate equivalents.

(4) After the test tube is sealed with parafilm, it is lightly shaken to disperse all of the clay, and it is then shaken up/down 20 times. The test tube is allowed to stand for 6 h without exposure to direct sunlight. Then, 5 mL of the supernatant of the dispersion are collected by means of a Hall pipette.

(5) The obtained liquid is used for measurement of the cell light absorptivity (ABS) of 1 cm under the condition of a wavelength of 380 nm using a UV spectrophotometer (UV-1200 manufactured by Shimadzu Corporation), and the obtained value is taken as the clay dispersibility in water with high hardness.

<Iron Precipitation Inhibition>

First, an aqueous solution of the measurement sample is prepared. That is, 150 g of a 0.05% aqueous solution of the sample are prepared (liquid A).

Then, the aqueous solution of iron ions is prepared as follows. That is, 2 g of iron(III) chloride hexahydride are taken, and pure water is added to 1000 g (liquid B).

In addition, an aqueous solution of sodium hydroxide is prepared as follows. 3.0 g of a 48% aqueous solution of sodium hydroxide are taken, and pure water is added to 1000 g (liquid C).

Said liquid A, liquid B and liquid C, 100 g each, are blended sequentially, and the mixture is blended for 10 min, and the mixture was left at rest for 2 hours. After having been subjected to suction filtration with 5 C filter paper (55 mm) and a Buchner funnel, the mixture was dried with a vacuum desiccator for 1 hour. Then, the value in percentage with respect to the L-value of the filtering paper and measured using a spectral colorimeter (SE-2000 manufactured by Nippon Denshoku Kogyo K.K.) is taken as the iron precipitation inhibition.

<Measurement of Residual Maleic Acid Quantity>

Using a high-speed liquid chromatograph (product of Hitachi, Ltd., L-7100 Model pump, L-7300 Model column oven, L-7200 Model auto sampler, L-7400 Model UV detector), it is measured under the following conditions.

Column: ShodexRSpak DE-413, product of Showa Denko K.K.

Eluting liquid: 0.1 wt % aqueous solution of phosphoric acid

Flow rate: 1 mL/min

Temperature: 40° C.

Detection wavelength: 200 nm

Polymer Example 1

Using maleic acid (hereinafter referred to as MA) as monomer (a), acrylic acid (hereinafter referred to as AA) as monomer (b), and sodium 2-hydroxy-3-allyloxypropane sulfonate (hereinafter referred to as HAPS) as monomer (c), a copolymer with a molar ratio (a)/(b)/(c)=45/45/10 was synthesized.

Then, 334.9 g of ion-exchanged water (hereinafter referred to as pure water), 432. 3 g of a 48% aqueous solution of sodium hydroxide (hereinafter referred to as 48% NaOH), 344.0 g of MA anhydride, and 425.1 g of 40% HAPS aqueous solution were initially added in a 2.5-L separatory flask made of SUS equipped with a thermometer, an agitator and a reflux cooling tube. While being agitated, the aqueous solution was heated with reflux at the boiling point. Then, while being agitated and the reflux state was maintained, for each component, by means of its own drip nozzle, continuous dropwise addition was performed at a uniform rate for each of the following substances: 315.9 g of an 80% aqueous solution of AA were added in 120 min from the start of polymerization; 66.6 g of 15% sodium persulfate (hereinafter referred to as 15% NaPS) were added in 120 min from the start of polymerization; 117.0 g of pure water were added in 80 min, 50 min after the start of polymerization; 33.3 g of 15% NaPS were added in 20 min, 120 min after the start of polymerization; and 26.8 g of a 35% aqueous solution of hydrogen peroxide (hereinafter referred to as 35% $H_2O_2$) were added in 50 min after the start of polymerization. After all dropwise additions, the boiling point reflux state was maintained for 30 min, until completion of polymerization.

After polymerization, 48% NaOH was used to adjust the pH and concentration, forming copolymer (1) with a pH of 7.3 and solids concentration of 46%.

It was found that the weight-average molecular weight Mw was 13,000, and the residual quantity of MA in solid content equivalent was 6300 ppm.

Polymer Example 2

Using MA as monomer (a), AA as monomer (b), and HAPS as monomer (c), a copolymer with molar ratio (a)/(b)/(c)=45/45/10 was synthesized.

Then, 334.9 g of pure water, 432.3 g of 48% NaOH, 344.0 g of MA anhydride, and 425.1 g of 40% HAPS aqueous solution were initially added in a 2.5-L separatory flask made of SUS equipped with a thermometer, an agitator and a reflux cooling tube. While being agitated, the aqueous solution was heated with reflux at the boiling point. Then, while being agitated under a constant reflux state, for each component, by means of its own drip nozzle, continuous dropwise addition was performed at a uniform rate for each of the following substances: 315.9 g of an 80% aqueous solution of AA were added in 120 min from the start of polymerization; 66.6 g of 15% sodium persulfate (hereinafter referred to as 15% NaPS) were added in 120 min from the start of polymerization; 117.0 g of pure water were added in 80 min, 50 min after the start of polymerization; 109.2 g of 15% NaPS were added in 140 min from the start of polymerization; 117.0 g of pure water were added in 80 min, 50 min after the start of polymerization; and 26.8 g of 35% $H_2O_2$ were added in 50 min after the start of polymerization. After all dropwise additions, the boiling point reflux state was maintained for 30 min, until completion of polymerization.

After polymerization, 48% NaOH was used to adjust the pH and concentration, forming copolymer (2) with a pH of 7.3 and a solids concentration of 46%.

It was found that the weight-average molecular weight Mw was 11,000, and the residual quantity of MA in solids equivalent was 5000 ppm.

Polymer Example 3

Using MA as monomer (a), AA as monomer (b), and HAPS as monomer (c), a copolymer with molar ratio (a)/(b)/(c)=45/45/10 was synthesized.

Then, 334.9 g of pure water, 432.3 g of 48% NaOH, 344.0 g of MA anhydride, and 425.1 g of 40% HAPS aqueous solution were initially added in a 2.5-L separatory flask made of SUS equipped with a thermometer, an agitator and a reflux cooling tube. While being agitated, the aqueous solution was heated with reflux at the boiling point. Then, while being agitated under constant reflux state, for each component, by means of its own drip nozzle, continuous dropwise addition was performed at a uniform rate for each of the following substances: 315.9 g of an 80% aqueous solution of AA were added in 120 min from the start of polymerization; 66.6 g of 15% NaPS were added in 110 min, 10 min after the start of polymerization; 117.0 g of pure water were added in 80 min, 50 min after the start of polymerization; 33.3 g of 15% NaPS were added in 20 min, 120 min after the start of polymerization; and 26.8 g of 35% $H_2O_2$ were added in 50 min after the start of polymerization. After all dropwise additions, the boiling point reflux state was maintained for 30 min, until completion of polymerization.

After polymerization, 48% NaOH was used to adjust the pH and concentration, forming copolymer (3) with a pH of 7.3 and solids concentration of 46%.

It was found that the weight-average molecular weight Mw was 13,000, and the residual quantity of MA in solids equivalent was 6700 ppm.

[Composition Formulations]

Example 4

Granular Laundry Detergent

| Formula | A wt % | B wt % | C wt % | D wt % | E wt % |
|---|---|---|---|---|---|
| $C_{11-12}$ Linear alkyl benzene sulphonate | 13-25 | 13-25 | 13-25 | 13-25 | 9-25 |
| $C_{12-18}$ Ethoxylate Sulfate | — | — | 0-3 | — | 0-1 |
| $C_{14-15}$ alkyl ethoxylate (EO = 7) | 0-3 | 0-3 | — | 0-5 | 0-3 |
| Dimethyl hydroxyethyl lauryl ammonium chloride | — | — | 0-2 | 0-2 | 0-2 |
| $C_{8-10}$—N$^+$—(CH$_2$CH$_2$)OH with two CH$_3$ groups | 20-40 | — | 18-33 | 12-22 | 0-15 |
| Sodium tripolyphosphate K1 | | | | | |
| Zeolite | 0-10 | 20-40 | 0-3 | — | — |
| Silicate builder | 0-10 | 0-10 | 0-10 | 0-10 | 0-10 |
| Carbonate | 0-30 | 0-30 | 0-30 | 5-25 | 0-20 |
| Diethylene triamine penta acetate | 0-1 | 0-1 | 0-1 | 0-1 | 0-1 |
| Polyacrylate | 0-3 | 0-3 | 0-3 | 0-3 | 0-3 |
| Carboxy Methyl Cellulose | 0.2-0.8 | 0.2-0.8 | 0.2-0.8 | 0.2-0.8 | 0.2-0.8 |
| Copolymer[1] | 1-20 | 1-20 | 5.0 | 10 | 2.5 |
| Percarbonate | 0-10 | 0-10 | 0-10 | 0-10 | 0-10 |
| Nonanoyloxybenzenesulfonate | — | — | 0-2 | 0-2 | 0-2 |

-continued

| Formula | A wt % | B wt % | C wt % | D wt % | E wt % |
|---|---|---|---|---|---|
| Tetraacetylethylenediamine | — | — | 0-0.6 | 0-0.6 | 0-0.6 |
| Zinc Phthalocyanine Tetrasulfonate | — | — | 0-0.005 | 0-0.005 | 0-0.005 |
| Brightener | 0.05-0.2 | 0.05-0.2 | 0.05-0.2 | 0.05-0.2 | 0.05-0.2 |
| $MgSO_4$ | — | — | 0-0.5 | 0-0.5 | 0-0.5 |
| Enzymes | 0-0.5 | 0-0.5 | 0-0.5 | 0-0.5 | 0-0.5 |
| Minors (perfume, dyes, suds stabilizers) | balance | balance | balance | balance | balance |

[1] A copolymer according to any of Examples 1, 2, or 3 or mixtures thereof.

Example 5

Granular Laundry Detergent

Aqueous Slurry Composition

| Component | % w/w Aqueous slurry |
|---|---|
| A compound having the following general structure: $bis((C_2H_5O)(C_2H_4O)n)(CH_3)\text{—}N^+\text{—}C_xH_{2x}\text{—}N^+\text{—}(CH_3)\text{-}bis((C_2H_5O)(C_2H_4O)n)$, wherein n = from 20 to 30, and x = from 3 to 8, or sulphated or sulphonated variants thereof | 1.23 |
| Ethylenediamine disuccinic acid | 0.35 |
| Brightener | 0.12 |
| Magnesium sulphate | 0.72 |
| Acrylate/maleate copolymer | 6.45 |
| Copolymer[1] | 1.60 |
| Linear alkyl benzene sulphonate | 11.92 |
| Hydroxyethane di(methylene phosphonic acid) | 0.32 |
| Sodium carbonate | 4.32 |
| Sodium sulphate | 47.49 |
| Soap | 0.78 |
| Water | 24.29 |
| Miscellaneous | 0.42 |
| Total Parts | 100.00 |

[1] A copolymer or any mixture of copolymers according to any of Examples 1, 2, or 3.

[Preparation of a Spray-Dried Powder]

An aqueous slurry having the composition as described above is prepared having a moisture content of 25.89%. The aqueous slurry is heated to 72° C. and pumped under high pressure (from $5.5\times10^6 Nm^{-2}$ to $6.0\times10^6 Nm^{-2}$), into a counter current spray-drying tower with an air inlet temperature of from 270° C. to 300° C. The aqueous slurry is atomised and the atomised slurry is dried to produce a solid mixture, which is then cooled and sieved to remove oversize material (>1.8 mm) to form a spray-dried powder, which is free-flowing. Fine material (<0.15 mm) is elutriated with the exhaust the exhaust air in the spray-drying tower and collected in a post tower containment system. The spray-dried powder has a moisture content of 1.0 wt %, a bulk density of 427 g/l and a particle size distribution such that 95.2 wt % of the spray-dried powder has a particle size of from 150 to 710 micrometers. The composition of the spray-dried powder is given below.

Spray-Dried Powder Composition

| Component | % w/w Spray-dried powder |
|---|---|
| A compound having the following general structure: $bis((C_2H_5O)(C_2H_4O)n)(CH_3)\text{—}N^+\text{—}C_xH_{2x}\text{—}N^+\text{—}(CH_3)\text{-}bis((C_2H_5O)(C_2H_4O)n)$, wherein n = from 20 to 30, and x = from 3 to 8, or sulphated or sulphonated variants thereof | 1.62 |
| Ethylenediamine disuccinic acid | 0.46 |
| Brightener | 0.16 |
| Magnesium sulphate | 0.95 |
| Acrylate/maleate copolymer | 8.45 |
| Copolymer[1] | 2.09 |
| Linear alkyl benzene sulphonate | 15.65 |
| Hydroxyethane di(methylene phosphonic acid) | 0.42 |
| Sodium carbonate | 5.65 |
| Sodium sulphate | 61.98 |
| Soap | 1.02 |
| Water | 1.00 |
| Miscellaneous | 0.55 |
| Total Parts | 100.00 |

[1] A copolymer or any mixture of copolymers according to any of Examples 1, 2, or 3.

[Preparation of an Anionic Surfactant Particle 1]

The anionic detersive surfactant particle 1 is made on a 520 g batch basis using a Tilt-A-Pin then Tilt-A-Plow mixer (both made by Processall). 108 g sodium sulphate supplied is added to the Tilt-A-Pin mixer along with 244 g sodium carbonate. 168 g of 70% active $C_{25}E_3S$ paste (sodium ethoxy sulphate based on $C_{12/15}$ alcohol and ethylene oxide) is added to the Tilt-A-Pin mixer. The components are then mixed at 1200 rpm for 10 seconds. The resulting powder is then transferred into a Tilt-A-Plow mixer and mixed at 200 rpm for 2 minutes to form particles. The particles are then dried in a fluid bed dryer at a rate of 2500l/min at 120° C. until the equilibrium relative humidity of the particles is less than 15%. The dried particles are then sieved and the fraction through 1180 μm and on 250 μm is retained The composition of the anionic detersive surfactant particle 1 is as follows:

25.0% w/w $C_{25}E_3S$ sodium ethoxy sulphate 18.0% w/w sodium sulphate 57.0% w/w sodium carbonate

[Preparation of a Cationic Detersive Surfactant Particle 1]

The cationic surfactant particle 1 is made on a 14.6 kg batch basis on a Morton FM-50 Loedige mixer. 4.5 kg of micronised sodium sulphate and 4.5 kg micronised sodium carbonate are premixed in the Morton FM-50 Loedige mixer. 4.6 kg of 40% active mono-$C_{12-14}$ alkyl mono-hydroxyethyl di-methyl quaternary ammonium chloride (cationic surfactant) aqueous solution is added to the Morton FM-50 Loedige mixer whilst both the main drive and the chopper are operating. After approximately two minutes of mixing, a 1.0 kg 1:1 weight ratio mix of micronised sodium sulphate and micronised sodium carbonate is added to the mixer. The resulting agglomerate is collected and dried using a fluid bed dryer on a basis of 2500 l/min air at 100-140° C. for 30 minutes. The resulting powder is sieved and the fraction through 1400 μm is collected as the cationic surfactant particle 1. The composition of the cationic surfactant particle 1 is as follows:

15% w/w mono-$C_{12-14}$ alkyl mono-hydroxyethyl di-methyl quaternary ammonium chloride 40.76% w/w sodium carbonate 40.76% w/w sodium sulphate 3.48% w/w moisture and miscellaneous

[Preparation of a Granular Laundry Detergent Composition]

10.84 kg of the spray-dried powder of example 6, 4.76 kg of the anionic detersive surfactant particle 1, 1.57 kg of the cationic detersive surfactant particle 1 and 7.83 kg (total amount) of other individually dosed dry-added material are dosed into a 1 m diameter concrete batch mixer operating at 24 rpm. Once all of the materials are dosed into the mixer, the mixture is mixed for 5 minutes to form a granular laundry detergent composition. The formulation of the granular laundry detergent composition is described below:

A granular laundry detergent composition

| Component | % w/w granular laundry detergent composition |
|---|---|
| Spray-dried powder from earlier table in Example 5 | 43.34 |
| 91.6 wt % active linear alkyl benzene sulphonate flake supplied by Stepan under the tradename Nacconol 90G ® | 0.22 |
| Citric acid | 5.00 |
| Sodium percarbonate (having from 12% to 15% active AvOx) | 14.70 |
| Photobleach particle | 0.01 |
| Lipase (11.00 mg active/g) | 0.70 |
| Amylase (21.55 mg active/g) | 0.33 |
| Protease (56.00 mg active/g) | 0.43 |
| Tetraacetyl ethylene diamine agglomerate (92 wt % active) | 4.35 |
| Suds suppressor agglomerate (11.5 wt % active) | 0.87 |
| Acrylate/maleate copolymer particle (95.7 wt % active) | 0.29 |
| Green/Blue carbonate speckle | 0.50 |
| Anionic detersive surfactant particle 1 | 19.04 |
| Cationic detersive surfactant particle 1 | 6.27 |
| Sodium sulphate | 3.32 |
| Solid perfume particle | 0.63 |
| Total Parts | 100.00 |

Example 6

Liquid Laundry Detergents

| Ingredient | A wt % | B wt % | C wt % | D wt % | E wt % |
|---|---|---|---|---|---|
| Sodium alkyl ether sulfate | 14.4% | | 9.2% | 5.4% | |
| Linear alkylbenzene sulfonic acid | 4.4% | 12.2% | 5.7% | 1.3% | |
| Alkyl ethoxylate | 2.2% | 8.8% | 8.1% | 3.4% | |
| Amine oxide | 0.7% | 1.5% | | | |
| Citric acid | 2.0% | 3.4% | 1.9% | 1.0% | 1.6% |
| Fatty acid | 3.0% | 8.3% | | | 16.0% |
| Protease | 1.0% | 0.7% | 1.0% | | 2.5% |
| Amylase | 0.2% | 0.2% | | | 0.3% |
| Lipase | | | 0.2% | | |
| Borax | 1.5% | 2.4% | 2.9% | | |
| Calcium and sodium formate | 0.2% | | | | |
| Formic acid | | | | | 1.1% |
| Copolymer[1] | 1.8% | 2.1% | | | 3.2% |
| Sodium polyacrylate | | | | 0.2% | |
| Sodium polyacrylate copolymer | | | 0.6% | | |
| DTPA[2] | 0.1% | | | | 0.9% |
| DTPMP[3] | | 0.3% | | | |
| EDTA[4] | | | | 0.1% | |
| Fluorescent whitening agent | 0.15% | 0.2% | 0.12% | 0.12% | 0.2% |
| Ethanol | 2.5% | 1.4% | 1.5% | | |
| Propanediol | 6.6% | 4.9% | 4.0% | | 15.7% |
| Sorbitol | | | 4.0% | | |
| Ethanolamine | 1.5% | 0.8% | 0.1% | | 11.0% |
| Sodium hydroxide | 3.0% | 4.9% | 1.9% | 1.0% | |
| Sodium cumene sulfonate | | 2.0% | | | |
| Silicone suds suppressor | | 0.01% | | | |

-continued

| Ingredient | A wt % | B wt % | C wt % | D wt % | E wt % |
|---|---|---|---|---|---|
| Perfume | 0.3% | 0.7% | 0.3% | 0.4% | 0.6% |
| Opacifier[5] | | 0.30% | 0.20% | | 0.50% |
| Water | balance | balance | balance | balance | balance |
| | 100.0% | 100.0% | 100.0% | 100.0% | 100.0% |

[1] A copolymer or any mixture of copolymers according to any of Examples 1, 2, or 3.
[2] diethylenetriaminepentaacetic acid, sodium salt
[3] diethylenetriaminepentakismethylenephosphonic acid, sodium salt
[4] ethylenediaminetetraacetic acid, sodium salt
[5] Acusol OP 301

| Ingredient | F wt % | G wt % | H wt % | I wt % | J wt % | K wt % |
|---|---|---|---|---|---|---|
| Alkylbenzene sulfonic acid | 7 | 7 | 4.5 | 1.2 | 1.5 | 12.5 |
| Sodium C12-14 alkyl ethoxy 3 sulfate | 2.3 | 2.3 | 4.5 | 4.5 | 7 | 18 |
| C14-15 alkyl 8-ethoxylate | 5 | 5 | 2.5 | 2.6 | 4.5 | 4 |
| C12 alkyl dimethyl amine oxide | — | 2 | — | — | — | — |
| C12-14 alkyl hydroxyethyl dimethyl ammonium chloride | — | — | — | 0.5 | — | — |
| C12-18 Fatty acid | 2.6 | 3 | 4 | 2.6 | 2.8 | 11 |
| Citric acid | 2.6 | 2 | 1.5 | 2 | 2.5 | 3.5 |
| Protease enzyme | 0.5 | 0.5 | 0.6 | 0.3 | 0.5 | 2 |
| Amylase enzyme | 0.1 | 0.1 | 0.15 | — | 0.05 | 0.5 |
| Mannanase enzyme | 0.05 | — | 0.05 | — | — | 0.1 |
| Copolymer[1] | 1.0 | .8 | 1 | 0.4 | 1.5 | 2.7 |
| Diethylenetriaminepenta(methylenephosphonic) acid | 0.2 | 0.3 | — | — | 0.2 | — |
| Hydroxyethane diphosphonic acid | — | — | 0.45 | — | — | 1.5 |
| FWA | 0.1 | 0.1 | 0.1 | — | — | 0.2 |
| Solvents (1,2 propanediol, ethanol), stabilizers | 3 | 4 | 1.5 | 1.5 | 2 | 4.3 |
| Hydrogenated castor oil derivative structurant | 0.4 | 0.3 | 0.3 | 0.1 | 0.3 | — |
| Boric acid | 1.5 | 2 | 2 | 1.5 | 1.5 | 0.5 |
| Na formate | — | — | — | 1 | — | — |
| Reversible protease inhibitor[3] | — | — | 0.002 | — | — | — |
| Perfume | 0.5 | 0.7 | 0.5 | 0.5 | 0.8 | 1.5 |
| Buffers (sodium hydroxide, Monoethanolamine) | | | To pH 8.2 | | | |
| Water and minors (antifoam, aesthetics, . . . ) | | | To 100 | | | |

[1] The copolymer or any mixture of copolymers according to any of Examples 1, 2, or 3.

| Ingredient | L wt % | M wt % | N wt % | O wt % | P wt % | Q wt % |
|---|---|---|---|---|---|---|
| Alkylbenzene sulfonic acid | 5.5 | 2.7 | 2.2 | 12.2 | 5.2 | 5.2 |
| Sodium C12-14 alkyl ethoxy 3 sulfate | 16.5 | 20 | 9.5 | 7.7 | 1.8 | 1.8 |
| Sodium C12-14 alkyl sulfate | 8.9 | 6.5 | 2.9 | — | | |
| C12-14 alkyl 7-ethoxylate | | | | | 0.15 | 0.15 |
| C14-15 alkyl 8-ethoxylate | | | | | 3.5 | 3.5 |
| C12-15 alkyl 9-ethoxylate | 1.7 | 0.8 | 0.3 | 18.1 | — | — |
| C12-18 Fatty acid | 2.2 | 2.0 | — | 1.3 | 2.6 | 2.6 |
| Citric acid | 3.5 | 3.8 | 2.2 | 2.4 | 2.5 | 2.5 |
| Protease enzyme | 1.7 | 1.4 | 0.4 | — | 0.5 | 0.5 |
| Amylase enzyme | 0.4 | 0.3 | — | — | 0.1 | 0.1 |
| Mannanase enzyme | | | | 0.04 | 0.04 | |
| Copolymer[1] | 2.1 | 1.2 | 1.0 | 2 | 1.00 | 0.25 |
| PEG-PVAc Polymer[2] | — | — | — | — | — | 0.3 |
| Ethoxysulfated Hexamethylene Diamine Dimethyl Quat | — | — | — | — | — | 0.7 |
| Diethylenetriaminepenta (methylenephosphonic) acid | | | | | 0.2 | 0.2 |
| FWA | — | — | — | — | .04 | .04 |
| Solvents (1,2 propanediol, ethanol, stabilizers | 7 | 7.2 | 3.6 | 3.7 | 1.9 | 1.9 |
| Hydrogenated castor oil derivative structurant | 0.3 | 0.2 | 0.2 | 0.2 | 0.35 | 0.35 |
| Polyacrylate | — | — | — | 0.1 | — | — |
| Polyacrylate copolymer[3] | — | — | — | 0.5 | — | — |
| Sodium carbonate | — | — | — | 0.3 | — | — |
| Sodium silicate | | | | | | |

| Ingredient | L wt % | M wt % | N wt % | O wt % | P wt % | Q wt % |
|---|---|---|---|---|---|---|
| Borax | 3 | 3 | 2 | 1.3 | — | — |
| Boric acid | 1.5 | 2 | 2 | 1.5 | 1.5 | 1.5 |
| Perfume | 0.5 | 0.5 | 0.5 | 0.8 | 0.5 | 0.5 |
| Buffers (sodium hydroxide, monoethanolamine) | | | | | 3.3 | 3.3 |
| Water, dyes and miscellaneous | Balance | | | | | |

[1] Copolymer or any mixture of copolymers according to any of Examples 1, 2, or 3.
[2] PEG-PVA graft copolymer is a polyvinyl acetate grafted polyethylene oxide copolymer having a polyethylene oxide backbone and multiple polyvinyl acetate side chains. The molecular weight of the polyethylene oxide backbone is about 6000 and the weight ratio of the polyethylene oxide to polyvinyl acetate is about 40 to 60 and no more than 1 grafting point per 50 ethylene oxide units.
[3] Alco 725 (styrene/acrylate)

Example 7

Liquid Dish Handwashing Detergents

| Composition | A | B |
|---|---|---|
| $C_{12-13}$ Natural AE0.6S | 29.0 | 29.0 |
| $C_{10-14}$ mid-branched Amine Oxide | — | 6.0 |
| $C_{12-14}$ Linear Amine Oxide | 6.0 | — |
| SAFOL ® 23 Amine Oxide | 1.0 | 1.0 |
| $C_{11}E_9$ Nonionic[2] | 2.0 | 2.0 |
| Ethanol | 4.5 | 4.5 |
| Copolymer[1] | 5.0 | 2.0 |
| Sodium cumene sulfonate | 1.6 | 1.6 |
| Polypropylene glycol 2000 | 0.8 | 0.8 |
| NaCl | 0.8 | 0.8 |
| 1,3 BAC Diamine[3] | 0.5 | 0.5 |
| Suds boosting polymer[4] | 0.2 | 0.2 |
| Water | Balance | Balance |

[1] A copolymer or any mixture of polymers according to any of Examples 1, 2, or 3.
[2] Nonionic may be either $C_{11}$ Alkyl ethoxylated surfactant containing 9 ethoxy groups.
[3] 1,3 BAC is 1,3 bis(methylamine)-cyclohexane.
[4] (N,N-dimethylamino)ethyl methacrylate homopolymer.

Example 8

Automatic Dishwasher Detergents

| | A | B | C | D | E | F | G |
|---|---|---|---|---|---|---|---|
| Sodium tripolyphosphate | 0 | 6 | 10 | 0-20 | 0 | 0 | 0 |
| Silicate solids | 6 | 6 | 6 | 6-10 | 1.5-2.5 | 2.5-6 | 2.5-6 |
| Carbonate | 35 | 40 | 40 | 25-40 | | 25-40 | 25-40 |
| Sodium Bicarbonate | | | | | 5-15 | | |
| Xanthan gum | | | | | 0.5-1.0 | | |
| MGDA | | | | | 4.0-7.5 | 4-7 | 2-4 |
| HEDP | | | | | | 0.05-0.3 | 0.05-0.3 |
| Nonionic surfactant[1] | 0 | 0 | 0 | 0.5-5 | 0.5-5 | 0.5-1.0 | 0.5-1.0 |
| Polymer dispersant[2] | 0.5 | 5 | 6 | 5 | | 0.1-2.0 | 0.1-2.0 |
| Polymer dispersant[3] | | | | | 0.5-3.0 | | |
| Copolymer[4] | 0.05-10 | 1 | 2.5 | 5 | 6-8 | 4-6 | 2-3 |
| Enzymes | 0.3-0.8 | 0.3-0.8 | 0.3-0.8 | 0.3-0.8 | 0.5-1.0 | 0.25-0.6 | 0.25-0.6 |
| Bleach and bleach activators | 4 | 4 | 4 | 4 | 0 | 2.0-4.0 | 2.0-4.0 |
| Disodium citrate dihydrate | 0 | 0 | 0 | 2-20 | 0 | 0 | 0 |
| Sodium Sulfate | 30-50 | 30-50 | 30-50 | 30-50 | 0 | 30-50 | 30-50 |
| Perfume | 0.01-0.1 | 0.01-0.1 | 0.01-0.1 | 0.01-0.1 | 0.01-0.1 | 0.01-0.1 | 0.01-0.1 |
| Water, dye and other adjuncts | Balance to 100% | Balance to 100% | Balance to 100% | Balance to 100% | Balance to 100% | Balance to 100% | Balance to 100% |

[1] Such as SLF-18 POLY TERGENT from the BASF Corporation.
[2] Copolymer such as ACUSOL ® 445N from Rohm & Haas or ALCOSPERSE ® 725 from Alco.
[3] Ethoxylated cationic diame such as those disclosed in U.S. Pat. No. 4,659,802.
[4] A copolymer or any mixture of copolymers according to any of Examples 1, 2, or 3.

Example 9

Automatic Dishwashing Unit-Dose products

| Example | A |
|---|---|
| Particulate composition | |
| STPP | 0 |
| Silicate | 2-8 |
| Carbonate | 25-50 |
| MGDA | 10-25 |
| Copolymer[1] | 5-10 |
| Polymer Dispersant[2] | 1-5 |
| Nonionic Surfactant[3] | 1-5 |
| Enzyme | 1-6 |

-continued

| Example | A |
|---|---|
| Bleach and Bleach Activators | 2.5-10 |
| Perfume | 0.05-1 |
| Sodium Sulfate | 0-10 |
| Liquid composition | |
| DPG | 40-50 |
| Nonionic Surfactant[3] | 40-50 |
| Neodol C11E9 | 0-5.0 |
| Glycerine | 0-5.0 |
| Dye | 0.1-1.0 |

[1] A copolymer or any mixture of copolymers according to any of Examples 1, 2, or 3.
[2] Copolymer such as ACUSOL ® 445N from Rohm & Haas or ALCOSPERSE ® 725 from Alco.
[3] Such as SLF-18 POLY TERGENT from the BASF Corporation.

The compositions of examples 1 to 4 are introduced in a two compartment layered PVA rectangular base pouch. The dual compartment pouch is made from a Monosol M8630 film as supplied by Chris-Craft Industrial Products. 17.2 g of the particulate composition and 4 g of the liquid composition are placed in the two different compartments of the pouch. The pouch dimensions under 2 Kg load are: length 3.7 cm, width 3.4 cm and height 1.5 cm. The longitudinal/transverse aspect ratio is thus 1.5:3.2 or 1:2.47. The pouch is manufactured using a two-endless surface process, both surfaces moving in continuous horizontal rectilinear motion as herein described. According to this process a first web of pouches is prepared by forming and filling a first moving web of open pouches mounted on the first endless surface and closing the first web of open pouches with the second web of filled and sealed pouches moving in synchronism therewith. The pouch is introduced in the 25 ml dispenser compartment of a Bosch Siemens 6032 dishwashing machine, the dispenser is closed and the washing machine operated in its normal 55° C. program.

Unless otherwise noted, all component or composition levels are in reference to the active level of that component or composition, and are exclusive of impurities, for example, residual solvents or by-products, which may be present in commercially available sources.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

All documents cited in the Detailed Description of the Invention are, are, in relevant part, incorporated herein by reference; the citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

Industrial Applicability

The present invention can be suitably used for laundry detergents or cleaning compositions.

The invention claimed is:

1. A laundry detergent or cleaning composition which comprises a copolymer composition comprising:
   i) a copolymer having a weight-average molecular weight of from about 12,000 to about 20,000 and comprising:
      a) 30-60 mol% structural units derived from monoethylenically unsaturated dicarboxylic acid (salt);
      b) structural units derived from monoethylenically unsaturated monocarboxylic acid (salt);
      c) structural units derived from monomers containing sulfonic acid (salt) groups and having no ester bonds or amido bonds, wherein the molar ratio of (a)/(b)/(c) is from about 30 to about 60/from about 30 to about 60/and from about 5 to about 16 where the sum of the molecular weight percent is 100%; and
   ii) 7,000 ppm or less of residual monoethylenically unsaturated dicarboxylic acid (salt) monomer; and
   wherein the laundry detergent composition further comprises from about 1% to about 4% by weight of the composition of a non-ionic surfactant, wherein the non-ionic surfactant is a $C_{12}$-$C_{18}$ alkyl ethoxylate; and wherein the laundry detergent composition comprises a chelant builder selected from the group consisting of methyl glycine diacetic acid, salts of methyl glycine diacetic acid and mixtures thereof.

2. A laundry detergent or cleaning composition according to claim 1 wherein the laundry detergent or cleaning composition is selected from the group consisting of liquid laundry detergent compositions, solid laundry detergent compositions, hard surface cleaning compositions, liquid hand dishwashing compositions, solid automatic dishwashing compositions, liquid automatic dishwashing, and tab/unit dose form automatic dishwashing compositions.

3. A laundry detergent or cleaning composition according to claim 1 wherein the detergent or cleaning composition comprises from about 1% to about 20% by weight of the detergent or cleaning composition, of the copolymer composition.

4. A laundry detergent or cleaning composition according to claim 1 wherein the monomer containing sulfonic acid or sulfonate groups and having no ester bonds or amido bonds is a 3-allyloxy-2-hydroxypropane sulfonic acid or sulfonate monomer.

5. A laundry detergent or cleaning composition according to claim 1 wherein the detergent or composition further comprises cleaning adjunct additives selected from the group consisting of enzymes, alkali builders, bleaches, bleaching assisting agents, perfumes, defoaming agents, bactericides, corrosion inhibitors, and mixtures thereof.

6. A laundry detergent or cleaning composition according to claim 1 further comprising one or more enzymes.

7. A laundry detergent or cleaning composition according to claim 1 further comprising a perfume.

8. A laundry detergent or cleaning composition according to claim 1 further comprising a corrosion inhibitor.

9. A cleaning implement comprising a nonwoven substrate and the laundry detergent or cleaning composition according to claim 1.

* * * * *